(12) United States Patent
Kantzes et al.

(10) Patent No.: US 10,261,506 B2
(45) Date of Patent: Apr. 16, 2019

(54) METHOD OF ADDING SOFTWARE TO A FIELD MAINTENANCE TOOL

(75) Inventors: Christopher P. Kantzes, Minneapolis, MN (US); Brad N. Mathiowetz, Lakeville, MN (US); Alden C. Russell, III, Minnetonka, MN (US)

(73) Assignee: FISHER-ROSEMOUNT SYSTEMS, INC., Austin, TX (US)

( * ) Notice: Subject to any disclaimer, the term of this patent is extended or adjusted under 35 U.S.C. 154(b) by 1183 days.

(21) Appl. No.: 10/435,819

(22) Filed: May 12, 2003

(65) Prior Publication Data

US 2004/0111238 A1    Jun. 10, 2004

Related U.S. Application Data

(63) Continuation-in-part of application No. 10/310,703, filed on Dec. 5, 2002, now Pat. No. 6,889,166.

(51) Int. Cl.
G05B 23/02    (2006.01)

(52) U.S. Cl.
CPC ................................ *G05B 23/0272* (2013.01)

(58) Field of Classification Search
USPC ....... 702/183, 184; 700/1; 73/1.63; 709/200; 717/174, 178; 713/2; 705/59
See application file for complete search history.

(56) References Cited

U.S. PATENT DOCUMENTS

| | | |
|---|---|---|
| 3,955,132 A | 5/1976 | Greenwood ..................... 323/15 |
| 4,337,516 A | 6/1982 | Murphy et al. ............... 364/551 |
| 4,630,265 A | 12/1986 | Sexton ............................ 370/86 |
| 4,635,214 A | 1/1987 | Kasai et al. ................... 364/551 |
| 4,707,796 A | 11/1987 | Calabro et al. ............... 364/552 |
| 4,954,923 A | 9/1990 | Hoeflich et al. ............... 361/111 |
| 4,964,125 A | 10/1990 | Kim ............................ 371/15.1 |
| 4,988,990 A | 1/1991 | Warrior ........................ 340/25.5 |

(Continued)

FOREIGN PATENT DOCUMENTS

DE       29917651        12/2000
DE     1993 0660 A1      1/2001

(Continued)

OTHER PUBLICATIONS

Shoji et al., Fieldbus System Engineering, 1999, Yokogawa Technical Report.*

(Continued)

*Primary Examiner* — Toan Le
(74) *Attorney, Agent, or Firm* — Christopher R. Christenson; Kelly, Holt & Christenson PLLC

(57) ABSTRACT

A handheld field maintenance tool is provided with a removable memory module. The module is preferably adapted to be removable in the presence of a hazardous environment. Further, the handheld field maintenance tool is adapted, via hardware, software, or both to automatically detect the presence of the removable memory module and to copy, or otherwise install, data from the module to the tool. Data can be placed on a removable memory module in any suitable manner including flashing flash memory within the removable memory module, or, in embodiments where the removable memory module includes both storage and input/output capability, transmitting software and/or data to the storage media through the input/output capability.

1 Claim, 3 Drawing Sheets

(56) References Cited

U.S. PATENT DOCUMENTS

| | | | |
|---|---|---|---|
| 5,005,142 A | 4/1991 | Lipchak et al. | 364/550 |
| 5,103,409 A | 4/1992 | Shimizu et al. | 364/556 |
| 5,113,303 A | 5/1992 | Herres | 361/45 |
| 5,148,378 A | 9/1992 | Shibayama et al. | 364/571.07 |
| 5,150,289 A | 9/1992 | Badavas | 364/154 |
| 5,197,328 A | 3/1993 | Fitzgerald | 73/168 |
| 5,426,774 A | 6/1995 | Banerjee et al. | 395/575 |
| 5,434,774 A | 7/1995 | Seberger | 364/172 |
| 5,442,639 A | 8/1995 | Crowder et al. | 371/20.1 |
| 5,469,156 A | 11/1995 | Kogure | 340/870.38 |
| 5,481,200 A | 1/1996 | Voegele et al. | 324/718 |
| 5,541,840 A * | 7/1996 | Gurne et al. | 701/33 |
| 5,570,300 A | 10/1996 | Henry et al. | 364/551.01 |
| 5,573,032 A | 11/1996 | Lenz et al. | 137/486 |
| 5,598,521 A | 1/1997 | Kilgore et al. | 395/326 |
| 5,623,605 A | 4/1997 | Keshav et al. | 395/200.17 |
| 5,665,899 A | 9/1997 | Willcox | 73/1.63 |
| 5,742,845 A | 4/1998 | Wagner | 395/831 |
| 5,752,249 A | 5/1998 | Macon, Jr. et al. | 707/103 |
| 5,764,891 A | 6/1998 | Warrior | 395/200.2 |
| 5,828,567 A | 10/1998 | Eryurek et al. | 364/184 |
| 5,838,187 A | 11/1998 | Embree | 327/512 |
| 5,873,070 A * | 2/1999 | Bunte et al. | 705/28 |
| 5,903,455 A | 5/1999 | Sharpe et al. | 700/83 |
| 5,909,368 A | 6/1999 | Nixon et al. | 364/131 |
| 5,923,557 A | 7/1999 | Eidson | 364/471.03 |
| 5,940,290 A | 8/1999 | Dixon | 364/138 |
| 5,956,658 A * | 9/1999 | McMahon | 702/83 |
| 5,956,663 A | 9/1999 | Eryurek | 702/183 |
| 5,960,214 A * | 9/1999 | Sharpe et al. | 710/15 |
| 5,970,430 A | 10/1999 | Burns et al. | 702/122 |
| 5,980,078 A | 11/1999 | Krivoshein et al. | 364/131 |
| 5,995,916 A | 11/1999 | Nixon et al. | 702/182 |
| 6,017,143 A | 1/2000 | Eryurek et al. | 364/148.06 |
| 6,023,399 A | 2/2000 | Kogure | 364/23 |
| 6,026,352 A | 2/2000 | Burns et al. | 702/182 |
| 6,047,222 A | 4/2000 | Burns et al. | 700/79 |
| 6,052,655 A | 4/2000 | Kobayashi et al. | 702/184 |
| 6,078,874 A * | 6/2000 | Piety et al. | 702/122 |
| 6,091,968 A | 7/2000 | Koohgoli et al. | 455/557 |
| 6,094,600 A * | 7/2000 | Sharpe | 700/19 |
| 6,111,738 A | 8/2000 | McGoogan | 361/91.5 |
| 6,119,047 A | 9/2000 | Eryurek et al. | 700/28 |
| 6,179,964 B1 | 1/2001 | Begemann et al. | 162/198 |
| 6,192,281 B1 | 2/2001 | Brown et al. | 700/2 |
| 6,195,591 B1 | 2/2001 | Nixon et al. | 700/83 |
| 6,209,074 B1 * | 3/2001 | Dell et al. | 711/170 |
| 6,211,623 B1 | 4/2001 | Wilhelm et al. | 315/224 |
| 6,236,334 B1 * | 5/2001 | Tapperson et al. | 340/825.37 |
| 6,263,487 B1 | 7/2001 | Stripf et al. | 717/1 |
| 6,270,920 B1 | 8/2001 | Nakanishi et al. | 429/163 |
| 6,298,377 B1 | 10/2001 | Hartikainen et al. | 709/223 |
| 6,304,934 B1 | 10/2001 | Pimenta et al. | 710/129 |
| 6,307,483 B1 | 10/2001 | Westfield et al. | 340/870.11 |
| 6,317,701 B1 * | 11/2001 | Pyotsia et al. | 702/188 |
| 6,324,607 B1 | 11/2001 | Korowitz et al. | 710/102 |
| 6,330,517 B1 * | 12/2001 | Dobrowski et al. | 702/104 |
| 6,356,191 B1 | 3/2002 | Kirkpatrick et al. | 340/501 |
| 6,370,448 B1 | 4/2002 | Eryurek | 700/282 |
| 6,377,859 B1 | 4/2002 | Brown et al. | 700/79 |
| 6,397,114 B1 | 5/2002 | Eryurek et al. | 700/51 |
| 6,405,362 B1 * | 6/2002 | Shih et al. | 717/174 |
| 6,434,504 B1 | 8/2002 | Eryurek et al. | 702/130 |
| 6,444,350 B1 | 9/2002 | Toya et al. | 429/30 |
| 6,449,574 B1 | 9/2002 | Eryurek et al. | 702/99 |
| 6,473,710 B1 | 10/2002 | Eryurek | 702/133 |
| 6,487,462 B1 | 11/2002 | Reeves | 700/73 |
| 6,505,517 B1 | 1/2003 | Eryurek et al. | 73/861.08 |
| 6,519,546 B1 | 2/2003 | Eryurek et al. | 702/130 |
| 6,532,392 B1 | 3/2003 | Eryurek et al. | 700/54 |
| 6,539,267 B1 | 3/2003 | Eryurek et al. | 700/51 |
| 6,539,384 B1 | 3/2003 | Zellner et al. | 707/10 |
| 6,594,603 B1 | 7/2003 | Eryurek et al. | 702/104 |
| 6,594,621 B1 | 7/2003 | Meeker | 702/185 |
| 6,598,828 B2 | 7/2003 | Fiebick et al. | 244/118.1 |
| 6,601,005 B1 | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,629,059 B2 * | 9/2003 | Borgeson et al. | 702/183 |
| 6,654,697 B1 | 11/2003 | Eryurek et al. | 702/47 |
| 6,697,681 B1 | 2/2004 | Stoddard et al. | 700/17 |
| 6,714,969 B1 | 3/2004 | Klein et al. | 709/219 |
| 6,775,271 B1 | 8/2004 | Johnson et al. | 370/352 |
| 6,889,166 B2 * | 5/2005 | Zielinski et al. | 702/183 |
| 6,973,508 B2 * | 12/2005 | Shepard et al. | 710/8 |
| 6,993,664 B2 * | 1/2006 | Padole et al. | 705/59 |
| 2001/0053065 A1 | 12/2001 | Cudini et al. | 361/728 |
| 2002/0004370 A1 | 1/2002 | Stengele et al. | |
| 2002/0065631 A1 | 5/2002 | Loechner | |
| 2002/0077711 A1 | 6/2002 | Nixon et al. | |
| 2002/0116540 A1 | 8/2002 | Maeda et al. | 709/317 |
| 2002/0123864 A1 | 9/2002 | Eryurek et al. | |
| 2003/0023408 A1 | 1/2003 | Wight et al. | |
| 2003/0023795 A1 | 1/2003 | Packwood et al. | |
| 2003/0033040 A1 | 2/2003 | Billings | 700/97 |
| 2003/0119568 A1 | 6/2003 | Menard | 455/572 |
| 2003/0158795 A1 | 8/2003 | Markham et al. | |
| 2004/0148503 A1 * | 7/2004 | Sidman | 713/167 |
| 2004/0172526 A1 * | 9/2004 | Tann et al. | 713/2 |
| 2004/0225796 A1 | 11/2004 | Hanson et al. | 710/301 |
| 2004/0230327 A1 | 11/2004 | Opheim et al. | 700/83 |
| 2005/0036372 A1 * | 2/2005 | Sasaki | 365/202 |
| 2006/0094466 A1 | 5/2006 | Tran | 455/558 |
| 2006/0161393 A1 * | 7/2006 | Zielinski et al. | 702/184 |

FOREIGN PATENT DOCUMENTS

| | | |
|---|---|---|
| EP | 1022626 A2 | 7/2000 |
| EP | 10222626 A2 | 7/2000 |
| GB | 2347232 | 8/2000 |
| JP | 2753592 | 1/1990 |
| JP | 2753592 JP | 1/1990 |
| WO | WO/96/12993 | 5/1996 |
| WO | WO/97/21157 | 6/1997 |
| WO | WO/98/14855 | 10/1997 |
| WO | WO/98/39718 | 9/1998 |
| WO | WO/00/41050 | 7/2000 |
| WO | WO 00/55700 | 9/2000 |
| WO | WO/02/027418 | 4/2002 |

OTHER PUBLICATIONS

Diedrich et al., Field Device Integration in DCS Engineering Using a Device Model, 1998, IEEE.*

Zulkifli et al., Generic Device Description for Complex HART Field Devices, Nov. 25-28, 2002, Communication Systems, ICCS 2002, The 8th International Conference, vol. 2, pp. 646-650.*

Dewey, Fieldbus Device Maintenance- Do I Need to Go to the Field Anymore?, the Instrumentation, Systems and Automation Society, ISA 2000.*

Simon et al., Field Devices- Models and their Realisations, Dec. 11-14, 2002, Industrial Technology, IEEE ICIT 2002, IEEE International Conference, vol. 1, pp. 307-312.*

Asset Management Solutions, HART Communicator, Jan. 2001, Fisher-Rosemount, Product Data Sheet, Bulletin 62.1.*

Jackson, A., Hand-Held Devices for Avionics System Maintenance, 1997 IEEE, pp. 489-502.*

"Multifunction PDA Calibrator Transmation Model 3-PMF1," Transmation, Apr. 2001.

"Fieldbus Standard for Use in Industrial Control Systems Part 2: Physical Layer Specification and Service Definition", ISA-S50.02-1992, pp. 1-93.

"HART Communicator," Asset Management Solutions, Fisher-Rosemount, Bulletin 62.1: Communicator, Jan. 2001, pp. 1-7.

The first Communication from Application No. 05826038.1, filed Nov. 9, 2005.

The Examination Report from Application No. 04252805.9, filed May 14, 2002.

(56) References Cited

OTHER PUBLICATIONS

EP Application No. 04077355.8-19 Communication pursuant to Article 94(3) EOC dated Oct. 5, 2017. 6 pages.

\* cited by examiner

METHOD OF ADDING SOFTWARE TO A FIELD MAINTENANCE TOOL

The present application is a Continuation-In-Part application of U.S. patent application Ser. No. 10/310,703, filed Dec. 5, 2002, now U.S. Pat. No. 6,889,166 entitled INTRINSICALLY SAFE FIELD MAINTENANCE TOOL.

BACKGROUND OF THE INVENTION

Intrinsically safe field maintenance tools are known. Such tools are highly useful in the process control and measurement industry to allow operators to conveniently communicate with and/or interrogate field devices in a given process installation. Examples of such process installations include petroleum, pharmaceutical, chemical, pulp and other processing installations. In such installations, the process control and measurement network may include tens or even hundreds of various field devices which periodically require maintenance to ensure that such devices are functioning properly and/or calibrated. Moreover, when one or more errors in the process control and measurement installation is detected, the use of an intrinsically safe hand held field maintenance tool allows technicians to quickly diagnose such errors in the field.

Intrinsic Safety requirements are intended to guarantee that instrument operation or failure cannot cause ignition if the instrument is properly installed in an environment that contains explosive gasses. This is accomplished by limiting the maximum energy stored in the transmitter in a worst case failure situation. Excessive energy discharge may lead to sparking or excessive heat which could ignite an explosive environment in which the transmitter may be operating.

Examples of intrinsic safety standards include European CENELEC standards EN50014 and 50020, Factory Mutual Standard FM3610, the Canadian Standard Association, the British Approval Service for Electrical Equipment in Flammable Atmospheres, the Japanese Industrial Standard, and the Standards Association of Australia.

One intrinsically safe field maintenance tool sold under the trade designation Model 275 HART® Communicator available from Fisher-Rosemount Systems, Inc., of Eden Prairie, Minn. HART® is a registered trademark of the HART® Communication Foundation. The Model 275 provides a host of important functions and capabilities and generally allows highly effective field maintenance. However, the Model 275 does not currently support communication with non-HART® (Highway Addressable Remote Transducer) devices.

The HART® protocol has a hybrid physical layer consisting of digital communication signals superimposed on the standard 4-20 mA analog signal. The data transmission rate is approximately 1.2 Kbits/SEC. HART® communication is one of the primary communication protocols in process industries.

Another major process industry communication protocol is known as the FOUNDATION™ fieldbus communication protocol. This protocol is based on an ISA standard (ISA-S50.01-1992, promulgated by the Instrument Society of America in 1992). A practical implementation was specified by the Fieldbus Foundation (FF). FOUNDATION™ Fieldbus is an all-digital communication protocol with a transmission rate of approximately 31.25 Kbits/SEC.

Known intrinsically safe field maintenance tools are not able to effectively interact using more than one process industry standard protocol. Providing a device that has the ability to operate with more than one process industry standard protocol as well as effectively providing protocol-specific calibration and configuration options would represent a significant advance in the art.

SUMMARY OF THE INVENTION

A handheld field maintenance tool is provided with a removable memory module. The module is adapted to be removable in the presence of a hazardous environment. Further, the handheld field maintenance tool is adapted, via hardware, software, or both to automatically detect the presence of the removable memory module and to copy, or otherwise install, data from the module to the tool. Data can be placed on a removable memory module in any suitable manner including flashing flash memory within the removable memory module, or, in embodiments where the removable memory module includes both storage and input/output capability, transmitting software and/or data to the storage media through the input/output capability.

DETAILED DESCRIPTION OF THE PREFERRED EMBODIMENTS

An improved intrinsically safe field maintenance tool in accordance with embodiments of the present invention is operable with at least two industry standard device descriptions. In one specific embodiment, an improved intrinsically safe field maintenance tool implements both HART® and fieldbus Device Description Language (DDL). The improved field maintenance tool is used to maintain both two-wire and four-wire (i.e. external power) field devices using these protocols. Preferably, both configuration and calibration are supported via DDL technology. DDL technology is known and additional reading regarding Device Description Language can be found in U.S. Pat. No. 5,960,214 to Sharp, Jr. et al.

The improved intrinsically safe field maintenance tool also facilitates a convenient display of diagnostic information from individual field devices (i.e. status bits) as well as providing advanced protocol-specific network troubleshooting features. Further details and benefits of the improved intrinsically safe field maintenance tool in accordance with embodiments of the present invention will be appreciated after reading the description below.

Figure 1:
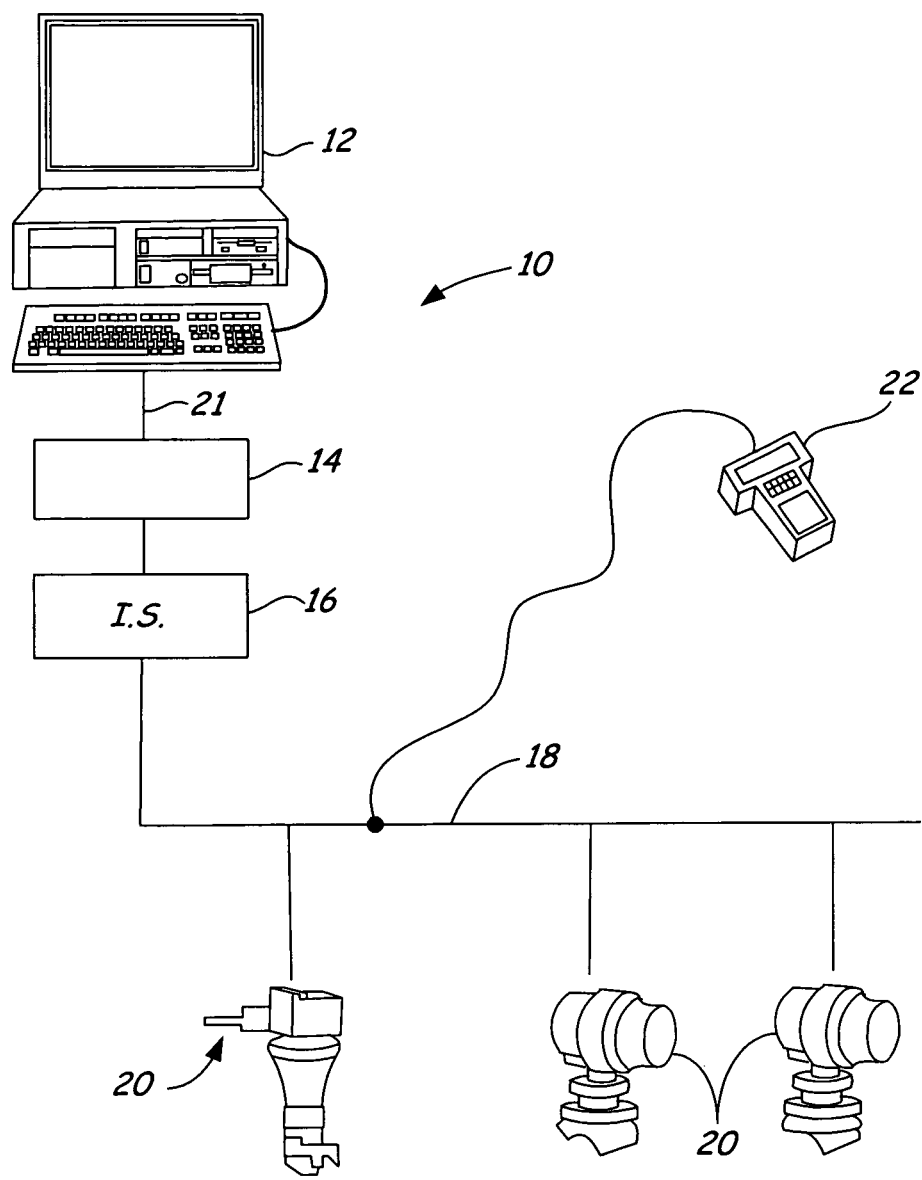
FIG. 1 illustrates a multidrop wiring configuration.

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ fieldbus process communication loop and is coupled to field devices 20, which are shown coupled arranged in a multi-drop configuration. An alternative process communication loop (not shown) is an HART® process communication loop. FIG. 1 illustrates a multi-drop wiring configuration that vastly simplifies system wiring compared to other topologies such as the star topology. Multi-drop HART® configurations support a maximum of 15 devices, while multi-drop FOUNDATION™ Fieldbus configurations support a maximum of 32 devices.

Intrinsically safe field maintenance tool 22 is coupled to loop 18 as illustrated in FIG. 1. When coupled to a process control loop as shown, tool 22 can perform a number of the communication and diagnostic functions. Tool 22 can couple to and interact with HART® process communication loops in much the same way the presently available Model 275 HART® Communicator can.

Figure 2A:
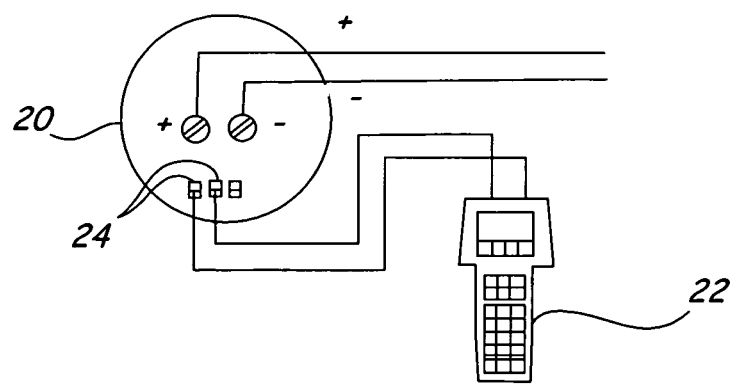
FIGS. 2A and 2B illustrate ways in which an intrinsically safe field maintenance tool may be connected to a process device.
Figure 2B:
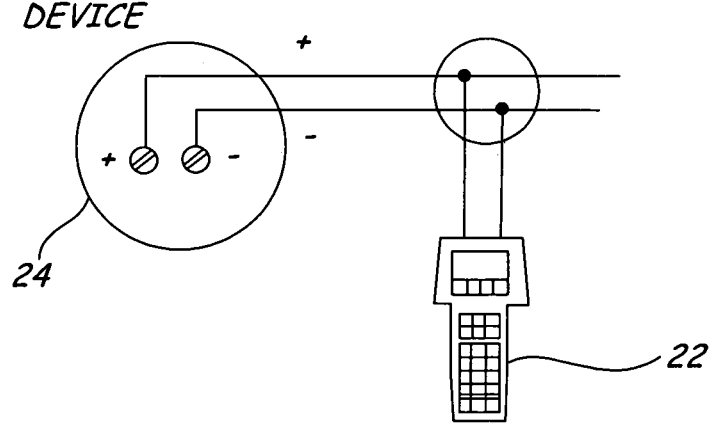

FIG. 2A illustrates tool 22 coupled to HART®-compatible device 20 via terminals 24. Alternately, tool 22 can communicate with a HART® compatible device on the process instrumentation communication loop, such as device 24 via the loop itself, as indicated in FIG. 2B.

Figure 3:
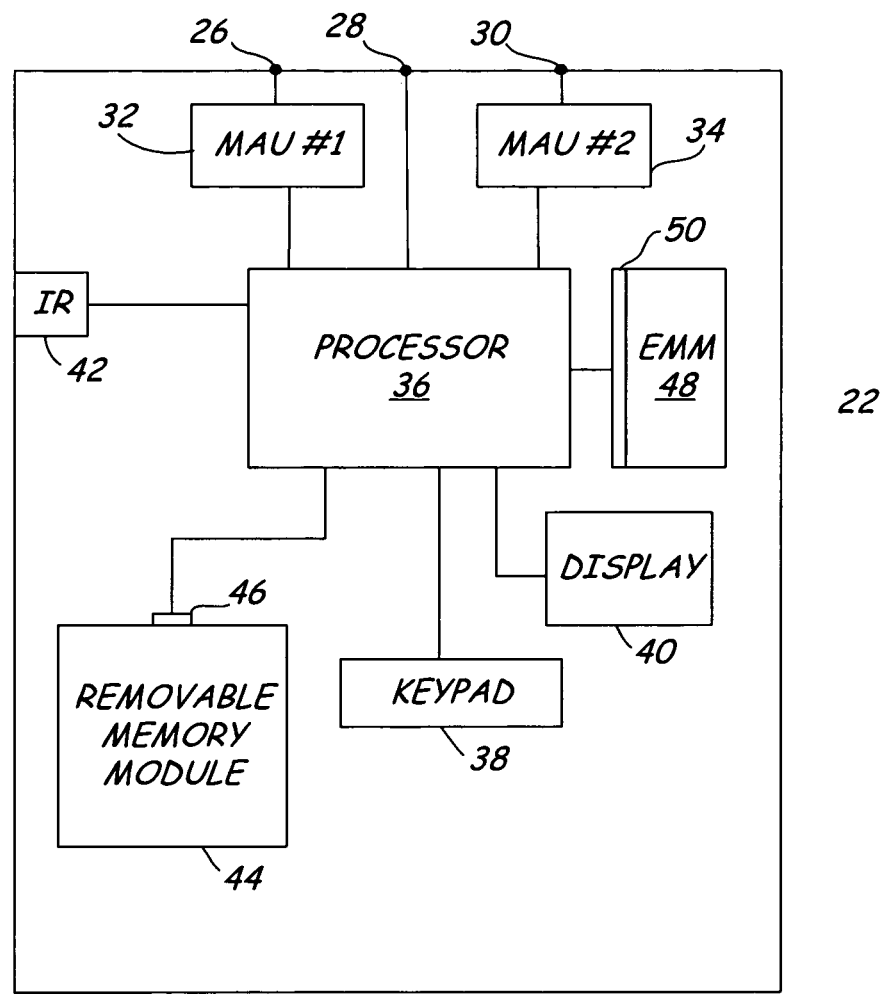
FIG. 3 is a diagrammatic view of field maintenance tool in accordance with an embodiment of the present invention.

FIG. 3 is a diagrammatic view of field maintenance tool 22 in accordance with embodiments of the present invention. As illustrated, tool 22 preferably includes three communication terminals 26, 28 and 30 which facilitate coupling tool 22 to process communication loops and/or devices in accordance with at least two process industry standard protocols. For example, when tool 22 is to be coupled to a loop of a first process industry standard protocol, such coupling is effected using terminal 26 and common terminal 28. Accordingly, the connection then is made via media access unit 32 which is configured to interact upon the process communication loop in accordance with the first industry standard protocol. Additionally, when tool 22 is to be coupled to a process and control measurement loop that operates in accordance with a second industry standard protocol, such connection is made via common terminal 28 and terminal 30. Thus, such a connection is effected via the second media access unit 34 which is configured to interact upon the process communication loop in accordance with the second industry standard protocol. Both media access units 32 and 34 are coupled to processor 36 which receives data from one of the media access units and interprets that data accordingly.

Processor 36 is also coupled to keypad module 38 and display module 40. Keypad module 38 is coupled to the keypad on the housing of tool 22 in order to receive various keypad inputs from a user. Display module 40 is coupled to the display to provide data and/or a user interface.

In accordance with various embodiments of the present invention, tool 22 includes additional hardware enhancements that facilitate increased functionality over that generally available in the prior art. In one embodiment, tool 22 includes infrared data access port 42 which is coupled to processor 36 to allow tool 22 to transfer information to and from a separate device using infrared wireless communication. One advantageous use of port 42 is for transferring and/or updating Device Descriptions stored in one or more memories of tool 22. A Device Description (DD) is a software technology used to describe parameters in a field device in a computer-readable format. This contains all of the information necessary for a software application being executed on processor 36 to retrieve and use the parametric data. The separate device such as computer 12, can obtain a new Device Description from floppy disk, CD ROM, or the internet and wirelessly transfer the new Device Description to tool 22.

Tool 22 preferably includes expansion memory module 48 coupled to processor 36 via connector 50 which is preferably disposed on the main board of tool 22. Expansion memory module 48 may contain Device Descriptions of first and second industry standard protocols. Module 48 may also contain license code(s) that will determine the functionality of tool 22 with respect to the multiple protocols. For example, data residing within module 48 may indicate that tool 22 is only authorized to operate within a single process industry standard mode, such as the HART® protocol. Ultimately, a different setting of that data within module 48 may indicate that tool 22 is authorized to operate in accordance with two or more industry standard protocols. Module 48 is preferably inserted to a connector 50 on the main board and may in fact require partial disassembly of tool 22, such as removing the battery pack to access port 50.

Tool 22 also includes removable memory module 44 which is removably coupled to processor 36 via port/interface 46. Removable memory module 44 is adapted to store software applications that can be executed instead of primary applications on processor 36. For example, module 44 may contain applications that use the HART®or FOUNDATION™ fieldbus communication port, to provide a comprehensive diagnostic for a given process device.

Module 44 may store software applications that aid in the calibration or configuration of specific devices. Module 44 may also store a software image for a new or updated primary device application that can subsequently be transferred into the non-volatile memory of device 36 to enable execution of the updated application. Further still, module 44 provides removable memory storage for the configuration of multiple devices allowing a field maintenance operator to acquire a relatively substantial amount of device data and conveniently store or transfer such data by simply removing module 44.

Preferably, the software installable via removable memory module 44 is separately licensable by allowing a field maintenance technician to purchase a license key with the software that is based upon the serial number of removable memory module 44. Preferably, tool 22 is configured, via hardware, software, or both, to detect when removable memory module 44 is coupled thereto and to automatically recognize the existence of additional software functionality within removable memory module 44. Once such additional functionality is recognized, the software or other data within module 44 is copied/installed to the random access memory (RAM) of tool 22. Thereafter, removable memory module 44 can be removed from tool 22 while the benefits of the added software functionality will persist. One form of removable memory module 44 includes commercially available flash memory, or a combination of storage and input/output capability. Essentially, removable memory module 44 includes any suitable storage media which can maintain data therein, and for which the physical package is amendable to the constraints listed below. By using removable memory module 44, multiple software applications and/or sets of data can be loaded into tool 22 without taking up additional space on the internal flash memory of tool 22.

Preferably, module 44 is adapted to be replaceable in hazardous areas in a process plant. Thus, it is preferred that module 44 comply with intrinsic safety requirements set forth in: APPROVAL STANDARD INTRINSICALLY SAFE APPARATUS AND ASSOCIATED APPARATUS FOR USE IN CLASS I, II AND III, DIVISION 1 HAZ- ARDOUS (CLASSIFIED) LOCATIONS, CLASS NUMBER 3610, promulgated by Factory Mutual Research October, 1988. Adaptations to comply with additional industrial standards such as Canadian Standards Association (CSA) and the European CENELEC standards are also contemplated. Examples of specific structural adaptations for memory module 44 and/or interface 46 to facilitate compliance include energy limiting circuits such that the operating voltage level of memory module 44 is sufficiently low that stored energy within module 44 cannot generate a source of ignition.

Module 44 may include current limiting circuitry to ensure that in the event that specific terminals on module 44 are shorted, that the discharge energy is sufficiently low that ignition is inhibited. Finally, interface 44 may include physical characteristics that are specifically designed to prevent exposure of electrical contacts on memory module 44 to an external environment while simultaneously allowing suitable interface contacts to make electrical contact with module 44. For example, module 44 may include an overmolding that can be pierced or otherwise displaced by coupling module 44 to interface 46.

Although the present invention has been described with reference to preferred embodiments, workers skilled in the art will recognize that changes may be made in form and detail without departing from the spirit and scope of the invention.

What is claimed is:

1. A method of adding application software to a handheld field maintenance tool, the method comprising:
   storing the application software on a removable memory module, the module being adapted to be replaceable in a hazardous location;
   removably coupling the removable memory module directly to the tool;
   installing the software into the tool from the removable memory module;
   decoupling the removable memory module from the tool; and
   executing the software on the tool;
   wherein installing begins automatically upon removably coupling the removable memory module to the tool.

* * * * *